US005161880A

United States Patent [19]

Azuma

[11] Patent Number: 5,161,880

[45] Date of Patent: Nov. 10, 1992

[54] LIGHT SOURCE DEVICE

[75] Inventor: Ichiro Azuma, Tokyo, Japan

[73] Assignee: Sony Corporation, Tokyo, Japan

[21] Appl. No.: 833,499

[22] Filed: Feb. 10, 1992

[30] Foreign Application Priority Data

Feb. 15, 1991 [JP] Japan ............................ 3-006373[U]

[51] Int. Cl.[5] ............................................ F21S 3/00

[52] U.S. Cl. .................................. 362/223; 362/268; 362/307; 362/311

[58] Field of Search ............... 362/268, 331, 307, 311, 362/223

[56] References Cited

U.S. PATENT DOCUMENTS 3,083,294 3/1963 Irland et al. ....................... 362/311

*Primary Examiner*—Carroll B. Dority

*Attorney, Agent, or Firm*—Lewis H. Eslinger; Jay H. Maioli

[57] ABSTRACT

A light source device comprises a lamp having a bar-shaped luminous body, a lamp housing having lamp supporting portions, a reflective curved interior surface for reflecting light from the lamp and an opening, and a light transmitting plate member which is composed of a lamination structure including a first diffusing plate, a linear Fresnel lens plate on which a plurality of striations are formed to extend in parallel with one another in a direction along the bar-shaped luminous body of the lamp and a second diffusing plate arranged in order, and attached to the lamp housing to be opposite to the reflective curved interior surface with the lamp between for covering the opening.

5 Claims, 2 Drawing Sheets

LIGHT SOURCE DEVICE

BACKGROUND OF THE INVENTION

1. Field of the Invention

The present invention relates generally to light source devices used for areal illumination, and more particularly, to a light source which comprises a lamp having a bar-shaped luminous body and a light transmitting plate member for diffusing light from the lamp to function as a flat light source.

2. Description of the Prior Art

There has been proposed an image display apparatus operative to make images on a liquid crystal display panel. In such an image display apparatus, it is usual to put a light source at the back of the liquid crystal display panel for illuminating the liquid crystal display panel from behind so that the images displayed on the liquid crystal display panel is improved in contrast. The light source provided at the back of the liquid crystal display panel is formed into a flat light source for making areal illumination so as to apply uniform light over the whole rear surface of the liquid crystal display panel.

The flat light source for illuminating the liquid crystal display panel from behind is required to be relatively high in brightness without luminous nonuniformity. Therefore, there has been also proposed a light source in which light from a fluorescent lamp is diffused for functioning as a flat light source. A light source device proposed previously for functioning as a flat light source is constituted by way of example as shown in FIGS. 1 and 2.

In the light source device shown in FIGS. 1 and 2, a fluorescent lamp 11 having a bar-shaped luminous body is put in a lamp housing 12 having an opening 12A. The lamp housing 12 is provided with lamp supporting portions 13A and 13B for supporting the fluorescent lamp 11 at both ends thereof and making an electrical connection with the fluorescent lamp 11, and a reflective curved interior surface 14 for reflecting the light from the fluorescent lamp 11 toward the opening 12A.

A translucent plate member 15 is attached to the lamp housing 12 to be opposite to the reflective curved interior surface 14 with the fluorescent lamp 11 between for covering the opening 12A. The translucent plate member 15 is composed of a luminous nonuniformity reducing sheet 16 made of transparent polycarbonate film on which aluminium is put by means of vacuum evaporation to form a thin layer having a predetermined pattern and a diffusing plate 17 made of transparent acrylic resin plate containing diffusing agent dispersed therein, both of which are superposed on and incorporated with each other with adhesive tapes 18 and 19 stuck to their end faces, and bonded to front end faces of the lamp housing 12 surrounding the opening 12A.

There has been further proposed another light source device in which a diffusing plate, which is provided for diffusing light emitted from a lamp to pass through the diffusing plate directly or after reflected by a reflective surface positioned to face to the lamp, is constituted to have a Fresnel lens at a portion thereof through which the light from the lamp passes directly, as disclosed in, for example, Japanese patent application published before examination under publication number 63-101921.

In the light source device proposed previously as shown in FIGS. 1 and 2, the light from the fluorescent lamp 11 enters into the trasnlucent plate member 15 directly or after reflected by the reflective curved interior surface 14 and is diffused by the trasnlucent plate member 15 to pass through the same to the outside. Accordingly, the translucent plate member 15 acts as a flat light source to emit the light over the whole area. However, the light source device as shown in FIGS. 1 and 2 encounters with disadvantages that the light from the fluorescent lamp 11 is not effectively utilized so that it is difficult to have satisfactorily high brightness with power consumption restricted to be reasonable and power consumption is considerably increased when satisfactorily high brightness is required.

Further, in the case of the light source device which has the diffusing plate provided with the Fresnel lens formed at the portion thereof through which the light from the lamp passes directly, there is a problem that the light passing through the Fresnel lens formed on the diffusing plate is unsatisfactorily diffused and therefore a flat light source having sufficiently uniform brightness over the whole area can not be obtained.

OBJECTS AND SUMMARY OF THE INVENTION

Accordingly, it is an object of the present invention to provide a light source device provided with a light transmission plate member for diffusing light from a lamp having a bar-shaped luminous body to function as a flat light source, which avoids the aforementioned disadvantages and problem encountered with the prior art.

Another object of the present invention is to provide a light source device provided with a light transmitting plate member for diffusing light from a lamp having a bar-shaped luminous body to function as a flat light source, by which sufficiently uniform brightness for the flat light source can be obtained over the whole area of the diffusing plate member.

A further object of the present invention is to provide a light source device provided with a light transmitting plate member for diffusing light from a lamp having a bar-shaped luminous body to function as a flat light source, by which the light from the lamp is effectively utilized for making an areal illumination and satisfactorily high brightness for the flat light source can be obtained with power consumption restricted to be reasonable.

According to the present invention, there is provided a light source device comprises a lamp having a bar-shaped luminous body, a lamp housing having lamp supporting portions and a reflective curved interior surface for reflecting light from the lamp, and a light transmitting plate member which is composed of a lamination structure including a first diffusing plate, a linear Fresnel lens plate on which a plurality of striations are formed to extend in parallel with one another in a direction along the bar-shaped luminous body of the lamp and a second diffusing plate arranged in order, and attached to the lamp housing to be opposite to the reflective curved interior surface with the lamp between.

In the light source device thus constituted in accordance with the present invention, both the light emitted from the lamp to enter the light transmitting plate member directly and the light emitted from the lamp to enter the light transmitting plate member after reflected by the reflective curved interior surface pass through the first diffusing plate, the linear Fresnel lens plate and the second diffusing plate to the outside and thereby the light transmitting plate member is operative substantially to emit the light from the whole area thereof to function as a flat light source. The light emitted from the light transmitting plate member is previously subjected to diffusing action by the first and second diffusing plate and satisfactorily diffused so as to have sufficiently uniform brightness over the whole area of the light transmitting plate member. Further, the light emitted from the light transmitting plate member passes previously through the linear Fresnel lens plate provided thereon with the striations extending in parallel with one another in the direction along the bar-shaped luminous body of the lamp and thereby is increased in quantity in a direction perpendicular to the outer surface of the light transmitting plate member. Accordingly, with the light source device according to the present invention, the light from the lamp is effectively utilized for making an areal illumination and satisfactorily high brightness for the flat light source is obtained with power consumption restricted to be reasonable.

The above, and other objects, features and advantages of the present invention will become apparent from the following detailed description which is to be read in conjunction with the accompanying drawings.

DESCRIPTION OF THE PREFERRED EMBODIMENT

Figure 1:
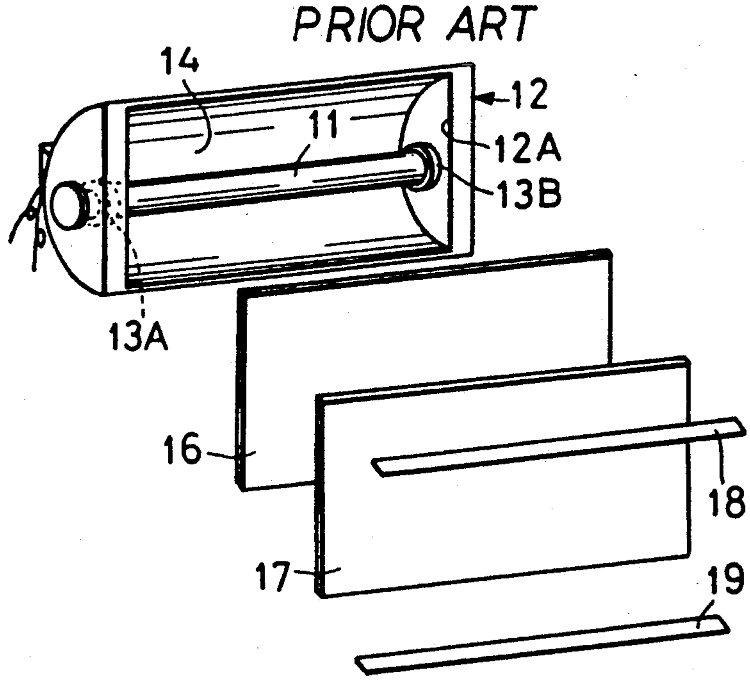
FIG. 1 is an exploded perspective view showing a previously proposed light source device used for functioning a flat light source.
Figure 2:
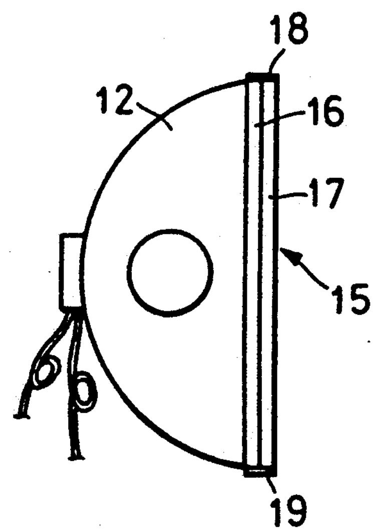
FIG. 2 is a side view of the previously proposed light source device shown in FIG. 1.
Figure 3:
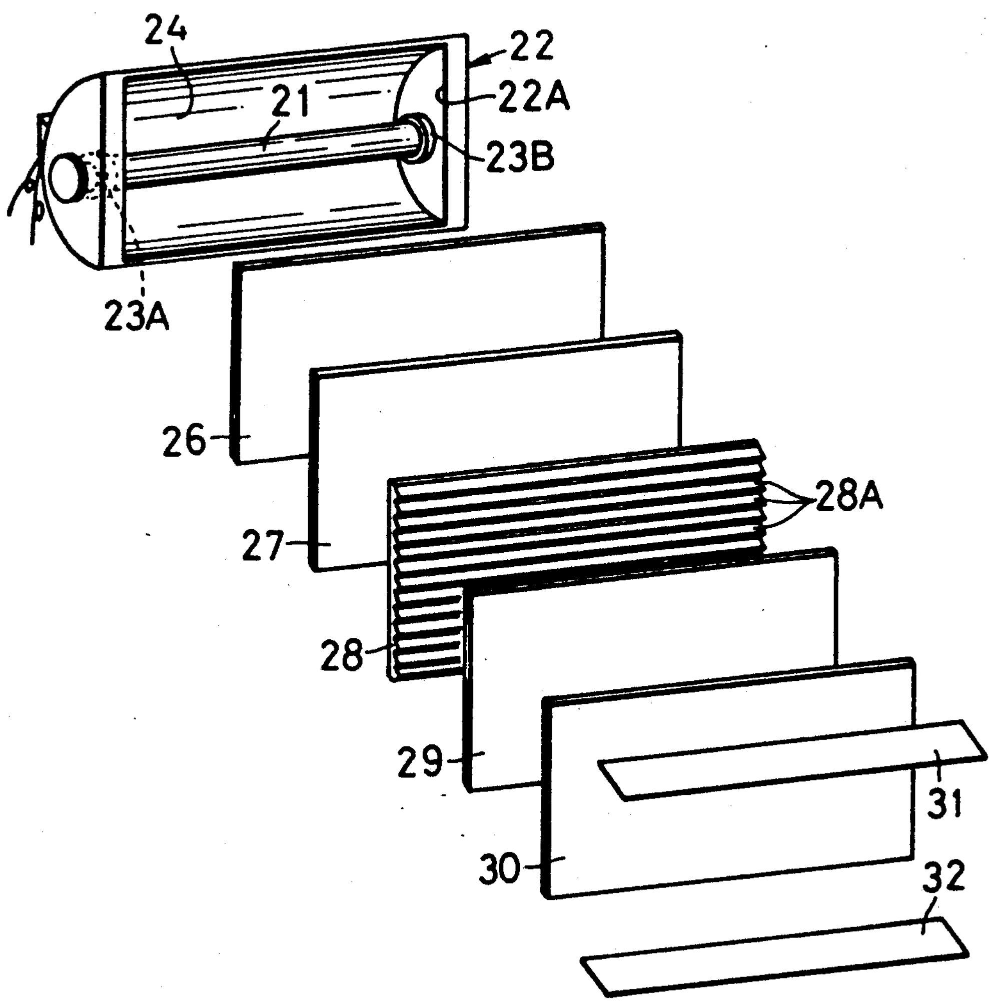
FIG. 3 is an exploded perspective view showing an embodiment of light source device according to the present invention.
Figure 4:
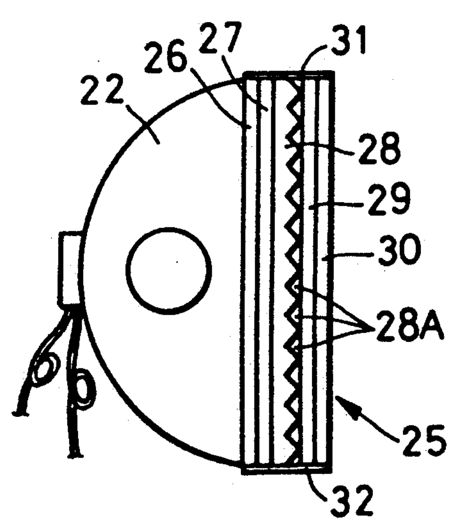
FIG. 4 is a side view of the embodiment shown in FIG. 3.

FIGS. 3 and 4 show an example of a light source device according to the present invention.

Referring to FIGS. 3 and 4, a fluorescent lamp 21 is put in a lamp housing 22 having an opening 22A. The lamp housing 22 is provided with lamp supporting portions 23A and 23B for supporting the fluorescent lamp 21 at both ends thereof and making an electrical connection with the fluorescent lamp 21, and a reflective curved interior surface 24 for reflecting the light from the fluorescent lamp 21 toward the opening 22A.

A light transmitting plate member 25 is attached to the lamp housing 22 to be opposite to the reflective curved interior surface 24 with the fluorescent lamp 21 between for covering the opening 22A. The light transmitting plate member 25 is composed of laminated structure formed by a luminous nonuniformity reducing sheet 26, a first diffusing plate 27, a linear Fresnel lens plate 28, a spacer 29 and a second diffusing plate 30 arranged in order, all of which are superposed on and incorporated with each other with adhesive tapes 31 and 32 stuck to their opposite end faces, and bonded at fringe portions of the inner surface thereof to front end faces of the lamp housing 22 surrounding the opening 22A.

The luminous nonuniformity reducing sheet 26 is made, for example, of transparent thin polycarbonate film material on which aluminium is put by means of vacuum evaporation to form a thin layer having a predetermined pattern, and positioned to receive first the light coming directly from the fluorescent lamp 21 and the light coming from the fluorescent lamp 21 after reflected by the reflective curved interior surface 24. The first diffusing plate 27 is made, for example, of transparent acrylic resin plate material containing diffusing agent dispersed therein, and positioned to receive the light having passed through the luminous nonuniformity reducing sheet 26.

The linear Fresnel lens plate 28 is made of transparent plate material having a surface on which a plurality of striations 28A each having a V-shaped cross section are formed, over the whole area of the surface, to extend in parallel with one another in a direction along the bar-shaped luminous body of the fluorescent lamp 21. The light having passed through the first diffusing plate 27 enters the linear Fresnel lens plate 28 from a plane surface opposite to the surface on which striations 28A are formed and emanates from the surface on which striations 28A are formed.

The spacer 29 is made,for example, of transparent polycarbonate plate material and disposed to form a predetermined space between the surface of the linear Fresnel lens plate 28, on which the striations 28A are formed, and the second diffusing plate 30. The second diffusing plate 30 is made, for example, of transparent acrylic resin plate material containing diffusing agent dispersed therein in the same manner as the first diffusing plate 27 and positioned to cause the light having passed through the spacer 29 to path therethrough to the outside of the light transmitting plate member 25. Namely, an outer surface of the light transmitting plate member 25 is formed with the second diffusing plate 30.

In the embodiment thus constituted, a part of light emitted from the fluorescent lamp 21 enters the luminous nonuniformity reducing sheet 26 directly and another part of light emitted from the fluorescent lamp 21 enters the luminous nonuniformity reducing sheet 26 after reflected by the reflective curved interior surface 24. Then, the light which is unified in brightness over the whole area of the luminous nonuniformity reducing sheet 26 enters the first diffusing plate 27 to be subjected to diffusing action by the first diffusing plate 27. The light having diffused by the first diffusing plate 27 enters the linear Fresnel lens plate 28 to be subjected to reflacting action by a Fresnel lens formed on the linear Fresnel lens plate 28 and thereby increased in quantity in a direction perpendicular to the surface of the linear Fresnel lens plate 28 on which the striations 28A are formed. The light emanating from the surface of the linear Fresnel lens plate 28 on which the striations 28A are formed passes through the spacer 29 and enters the second diffusing plate 30 to be subjected to diffusing action by the second diffusing plate 30. The light having diffused again by the second diffusing plate 30 goes outside the light transmitting plate member 25 from the whole area of the second diffusing plate 30.

In such a manner as mentioned above, the light emitted from the outer surface of the light transmitting plate member 25 is previously unified in brightness by the luminous nonuniformity reducing sheet 26 and diffused satisfactorily by the first and second diffusing plates 27 and 30 so as to have sufficiently uniform brightness over the whole area of an outer surface of the light transmitting plate member 25 and further increased in quantity in the direction perpendicular to the outer surface of the light transmitting plate member 25 by the linear Fresnel lens plate 28. Accordingly, with the embodiment shown in FIGS. 3 and 4, the light from the fluorescent lamp 21 is effectively utilized for making an areal illumination and sufficiently uniform and satisfactorily high brightness for a flat light source is obtained with power consumption restricted to be reasonable.

What is claimed is:

1. A light source device comprising:

a lamp having a bar-shaped luminous body, a lamp housing having lamp supporting portions and a reflective curved interior surface for reflecting light from said lamp, and a light transmitting plate member attached to said lamp housing to be opposite to said reflective curved interior surface with said lamp therebetween, said light transmitting plate member being composed of a lamination structure including a first diffusing plate, a linear Fresnel lens plate on which a plurality of striations are formed to extend in parallel with one another in a direction along the bar-shaped luminous body of said lamp and a second diffusing plate arranged in order.

2. A light source device according to claim 1, wherein said lamp consists of a fluorescent lamp.

3. A light source device according to claim 1, wherein said lamp housing has an opening through which the light from said lamp passes outside said lamp housing and said light transmitting plate member is disposed to cover said opening.

4. A light source device according to claim 1, wherein said lamination structure composing said light transmitting plate member further includes a luminous nonuniformity reducing sheet by which the light entering said light transmitting plate member is unified in brightness.

5. A light source device according to claim 4, wherein said lamination structure composing said light transmitting plate member further includes a spacer for making a predetermined space between a surface of said linear Fresnel lens plate on which the striations are formed and said second diffusing plate.

* * * * *